(12) United States Patent
Bosscher et al.

(10) Patent No.: US 8,602,456 B2
(45) Date of Patent: Dec. 10, 2013

(54) BALL JOINT HAVING A PASSAGEWAY FOR ROUTING A CABLE THERETHROUGH

(75) Inventors: Paul M. Bosscher, West Melbourne, FL (US); Matthew D. Summer, Melbourne, FL (US); John B. Rust, Palm Bay, FL (US); Loran J. Wilkinson, Palm Bay, FL (US); William S. Bowman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 497 days.

(21) Appl. No.: 12/963,964

(22) Filed: Dec. 9, 2010

(65) Prior Publication Data
US 2012/0150351 A1   Jun. 14, 2012

(51) Int. Cl.
*F16L 27/04*   (2006.01)
(52) U.S. Cl.
USPC ..................................... 285/261; 74/471 XY
(58) Field of Classification Search
USPC ............... 285/261, 262, 282; 74/471 XY, 491
See application file for complete search history.

(56) References Cited

U.S. PATENT DOCUMENTS

| | | | | |
|---|---|---|---|---|
| 1,317,193 A | * | 9/1919 | Kiel | 285/261 |
| 1,425,635 A | * | 8/1922 | Dod | 285/261 |
| 1,931,122 A | * | 10/1933 | Zerk | 285/261 |
| 2,052,069 A | * | 8/1936 | Arras | 285/262 |
| 2,316,069 A | | 4/1943 | Hocher | |
| 2,455,334 A | * | 11/1948 | Schmidt et al. | 285/261 |
| 2,511,495 A | * | 6/1950 | Crot | 285/261 |
| 2,699,342 A | * | 1/1955 | May | 285/282 |
| 3,033,596 A | * | 5/1962 | Pearring | 285/261 |
| 3,034,809 A | * | 5/1962 | Greenberg | 285/282 |
| 3,186,736 A | * | 6/1965 | Warshawsky | 285/282 |
| 3,312,482 A | * | 4/1967 | Barrett et al. | 285/282 |
| 3,475,079 A | * | 10/1969 | Stricker | 359/615 |
| 3,860,271 A | * | 1/1975 | Rodgers | 285/261 |
| 4,045,054 A | * | 8/1977 | Arnold | 285/261 |
| 4,619,290 A | * | 10/1986 | Katz | 285/262 |
| 4,837,734 A | | 6/1989 | Ichikawa et al. | |
| 4,842,308 A | * | 6/1989 | Spotts | 285/261 |
| 4,893,981 A | | 1/1990 | Yoshinada et al. | |

(Continued)

FOREIGN PATENT DOCUMENTS

DE    10 27 473 B    4/1958

OTHER PUBLICATIONS

European Search Report mailed Mar. 14, 2012, Application No. 11009317.6-2424, in the name of Harris Corporation.

*Primary Examiner* — David E Bochna
(74) *Attorney, Agent, or Firm* — Fox Rothschild, LLP; Robert J. Sacco (57) ABSTRACT

A ball joint (1) is provided having a ball housing (10) that defines a socket (11), and a ball pivot (20) with a ball head (22) and ball pin (24), where the ball head (22) is disposed in the socket (11). A ball housing passageway (14) passes through the ball housing (10); a ball pin passageway (25) passes through the ball pin (24), and a ball head passageway (23) passes through the ball head (22). The ball pin passageway (25), ball head passageway (23) and ball housing passageway (14) are in communication with each other for routing a cable (2) through the ball joint (1). A limiter (50) may extend from an internal surface (12) of the socket (11) having a passageway (52) connected to the ball housing passageway (14). The limiter (50) prevents unlimited spinning of the ball head (22) within the socket (11).

18 Claims, 4 Drawing Sheets

(56) References Cited

U.S. PATENT DOCUMENTS

| | | |
|---|---|---|
| 5,004,391 A | 4/1991 | Burdea |
| 5,391,014 A * | 2/1995 | Chen .................... 285/261 |
| 5,410,232 A * | 4/1995 | Lee .................... 318/568.11 |
| 5,694,013 A | 12/1997 | Stewart et al. |
| 5,712,478 A * | 1/1998 | Olsson .................... 250/231.13 |
| 5,831,408 A | 11/1998 | Jacobus et al. |
| 5,905,562 A | 5/1999 | Isogai et al. |
| 6,047,610 A | 4/2000 | Stocco et al. |
| 6,246,390 B1 | 6/2001 | Rosenberg |
| 6,281,651 B1 | 8/2001 | Haanpaa et al. |
| 6,535,793 B2 | 3/2003 | Allard |
| 6,636,161 B2 | 10/2003 | Rosenberg |
| 6,705,871 B1 | 3/2004 | Bevirt et al. |
| 6,781,569 B1 | 8/2004 | Gregorio et al. |
| 7,138,981 B2 | 11/2006 | Kim et al. |
| 7,345,672 B2 | 3/2008 | Jacobus et al. |
| 7,480,600 B2 | 1/2009 | Massie et al. |
| 7,618,068 B2 * | 11/2009 | Henry et al. .................... 285/282 |
| 7,854,563 B2 * | 12/2010 | Erskine .................... 285/261 |
| 2003/0019511 A1 | 1/2003 | Liu |
| 2006/0066574 A1 | 3/2006 | Kim et al. |

* cited by examiner

BALL JOINT HAVING A PASSAGEWAY FOR ROUTING A CABLE THERETHROUGH

STATEMENT OF THE TECHNICAL FIELD

The inventive arrangements relate to a ball joint, and particularly ball joints that facilitate routing of cables.

DESCRIPTION OF THE RELATED ART

Robotic systems are growing increasingly common for use in areas in which a human may be subjected to dangerous or otherwise unpleasant work environments. Such applications include explosive ordinance disposal, search and rescue missions, environmental analysis or inspection at toxic sights and the like. These robotic systems are typically controlled remotely. Control units for telematic control of robotic systems may utilize ball joints, in which the movement of the ball by a user can be measured by one or more sensors and converted into corresponding signals that are transmitted to the robotic system to cause it to move in a desired manner in accordance with the transmitted signals. By keeping cables internal to the mechanism the cables avoid snagging on objects (or the user) or getting pinched in other parts of the mechanism, thereby avoiding wear on the cables and providing improved aesthetics.

U.S. Pat. No. 4,842,308 (the "'308 patent") discloses a ball joint adapted to permit electrical wires to pass through it. The ball joint disclosed in the '308 patent is used to allow attitude adjustment of an electrical fixture connected to a fixed service mount. This ball joint, however, is designed to have a very limited range of motion, and thus is not suitable for use in many applications. In addition, the design in the '308 patent is inferior due to increased wear on the cables at the exit of the ball; it only allows the cable to exit at the rear of the ball, and cutting away ball material in both the top and back reduces the bearing surface of the ball, resulting in increased ball wear and rougher ball rotation.

SUMMARY OF THE INVENTION

The invention concerns a ball joint that includes a ball housing defining a socket having an inner surface. The ball housing has an opening and a first passageway. A ball pivot is disposed in the socket, and includes a ball head and a ball pin. The ball pin is disposed through the opening. The surface of the ball head has a first region conformal to at least a portion of the inner surface of the socket and a second region that is not conformal to the inner surface of the socket. According to one aspect of the invention, the second region is cone-shaped. The angular extents of the opening with respect to the socket can be less than corresponding angular extents of the second region with respect to the ball head.

The ball head includes a second passageway connected to the second region and to the ball pin, and the ball pin includes a third passageway connected to the second passageway and to an external surface of the ball pin. The first passageway extends along a first direction, the opening faces a second direction, and the first direction and second direction are not parallel to each other (i.e. they are transverse). In some specific embodiments the first direction and the second direction are from 80 to 100 degrees with respect to each other.

A limiter can be provided as part of the socket extending above the internal surface. The limiter includes a fourth passageway that connects with the first passageway. The ball joint can be included as part of a control unit for telematic control of robotic systems. In this regard, the control unit can further include one or more sensors disposed within the ball joint. Also, control circuitry is provided in communication with the one or more sensors for communicating with a remote robotic system.

The ball joint can alternatively be understood as including a ball pivot including a ball head and a ball pin. The ball head has a partially spherical shape and the ball pin extends in a radial direction from a surface defined by the ball head. A ball housing defines a socket in which the ball head is positioned. The socket is configured to permit the ball head to rotate therein about three separate orthogonal axes of rotation. A ball pin passage extends through the ball pin. A ball housing passage extends through a wall of the ball housing from an interior of the ball housing to an exterior of the ball housing. A ball head passage extends through the ball head, from the ball pin passage to the ball housing passage. The ball head passage has at least a first section which extends in a first direction, and a second section which extends in a second direction, such that the first direction is transverse to the second direction.

The first section of the ball head passage has an opening that is aligned with the ball pin passage. The second section has an opening that is coincident with an opening defined by the ball housing passage within an interior of the ball housing. In some embodiments the second section is cone-shaped, and the first section is in communication with and connected to the second section at an apex portion of the cone shape. At least one limiter pin is disposed on the ball housing such that the limiter pin extends into a hollow defined within the ball head, the hollow being formed from a portion of the second section. The limiter pin is generally aligned with the ball housing passage, and further includes a limiter pin passage extending from the interior of the ball housing to the exterior of the ball housing. In some embodiments, at least one control cable extends through the ball pin passage, the ball head passage, and the ball housing passage.

A handle grip is secured to a proximal end of the ball pin that is spaced away from the ball head and in some embodiments the control cable extends from the ball pin passage to an interior of the handle grip. According to one aspect, the ball housing is pivotally attached to a plurality of articulated arms configured to allow linear movement of the ball housing in a direction aligned with at least one of the three separate orthogonal axes of rotation.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. The figures are not drawn to scale and they are provided merely to illustrate the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1:
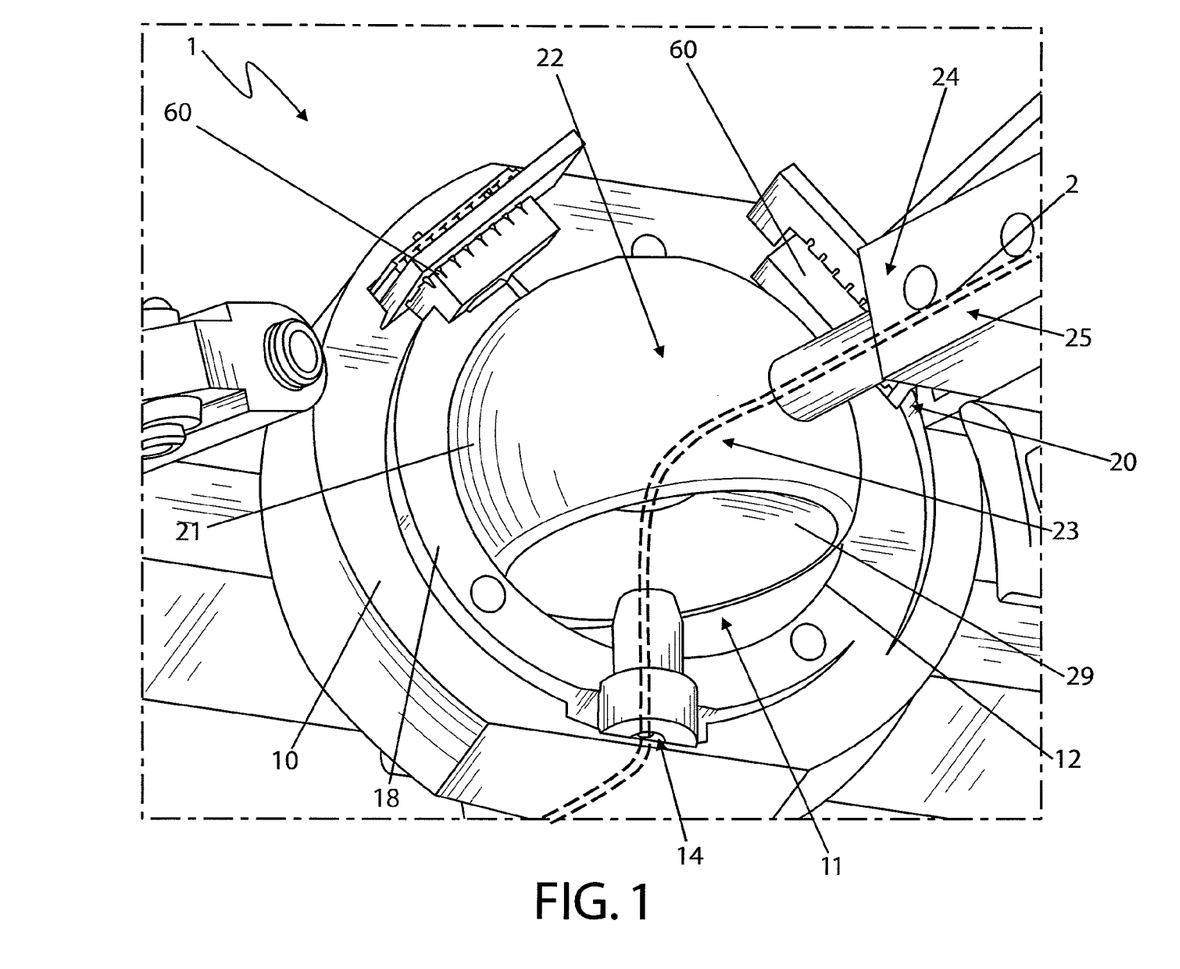
FIG. 1 is a perspective cutaway view of a ball joint that is useful for understanding the invention.
Figure 2:
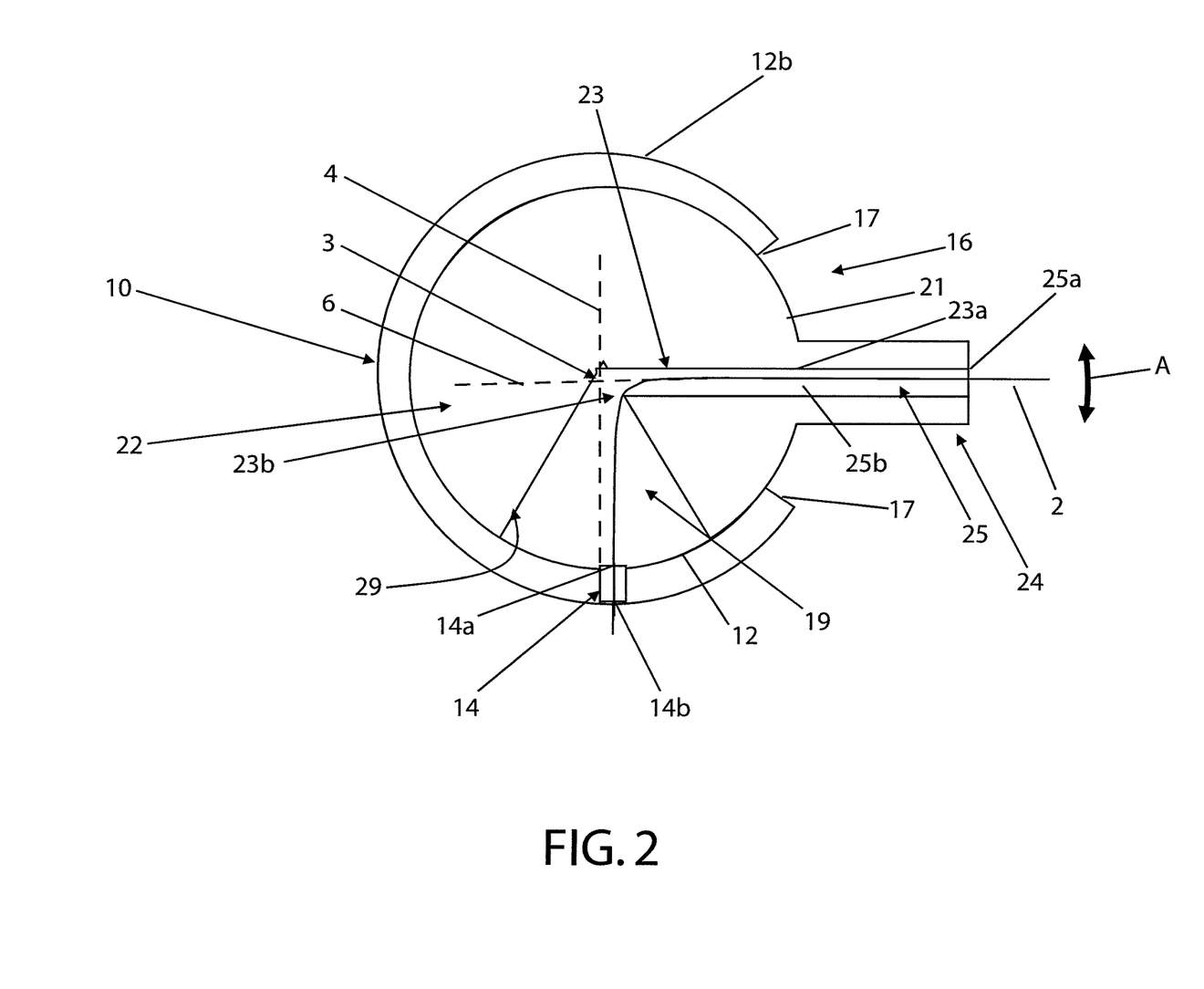
FIGS. 2 and 3 are side views of various ball joints that are useful for understanding the invention.

With reference to FIG. 1 and FIG. 2, a ball joint 1 is shown that is useful for understanding the invention. The ball joint 1 includes a ball housing 10, which is shown partially cut away in FIG. 1 to reveal a socket 11 defined within the ball housing 10 that is configured to accept a ball pivot 20. The socket 11 is at least partially spherical in shape. The ball pivot 20 comprises two parts: a ball head 22 and a ball pin 24. In preferred embodiments the ball head 22 has a shape that is generally partially spherical; that is, a portion of the ball head 22 is spherical in shape. The external surface of the ball head 22 has a first region 21 that is semi-spherical in shape and which is in direct mechanical contact or engagement with an inner surface 12 of the housing 10. As shown in FIG. 1, the first region 21 is generally conformal to the inner surface 12 of the socket 11. The external surface of the ball head 22 has a second region 29 that does not contact or directly engage with the inner surface 12, and thus is not conformal to the inner surface 12 of the socket 11. This second region 29 need not be spherical in shape, and in some embodiments can be concave or conical. The ball head 22 fits snugly within the conjugate at least partially spherical inner surface 12 defined within the interior of the ball housing 10. The ball housing 10, ball head 22 and ball pin 24 comprise respective open passageways 14, 23 and 25 in serial communications with each other for routing a cable 2 therethrough; that is, the cable 2 passes in sequence through the passageways 25, 23 and 14.

As shown in FIG. 2, with respect to a cross-section that is substantially along the longitudinal length of the ball pin 24, the ball housing 10 is generally C-shaped. Hence, the housing 10 has an opening 16, which in some embodiments is circular, although it will be appreciate that other shapes can be used, which can be useful when desiring to limit movement of the ball pin 24 to predefined extents. The ball pin 24 extends through the opening 16. In some embodiments, the diameter of the opening 16 is advantageously formed somewhat smaller than the diameter of the ball head 22 in order to retain the ball head 22 inside the socket 11. In other embodiments, the size of the opening 16 can be larger than the diameter of the ball head 22, and the ball joint 1 can further include a sealing cup (not shown) fitted around the opening 16 and having an opening that is smaller than the diameter of the ball head 22. In yet other embodiments, the sealing cup can also be used even where the ball housing opening 16 itself is smaller than the diameter of the ball head 22; for example, it can be desirable to provide replaceable sealing cups having openings of differing shapes, each designed to limit movement of the ball pin 24 to respective predefined extents. In some embodiments the sealing cup can be tapered in shape and sealingly connect with the sidewall of the ball head pin 24 so as to provide a protective cover that prevents debris from entering into the opening 16. The ball housing opening 16, the opening in the sealing cup, or both are dimensioned to allow the ball pivot 20 to freely rotate as desired by a user within the confines of the sidewall 17 defined by opening 16, sealing cup, or both.

Referring back to FIG. 1, the inner surface 12 can be provided by a bearing surface 18 (not shown in FIG. 2) disposed inside the socket 11 to facilitate movement of the ball pivot 20 in relation to the housing 20. The bearing surface 18 can be detachably connected to the housing 10 or can be an integral part of the housing 10. The bearing surface 18 can reduce friction between the ball pivot 20 and the housing 10, which decreases wear and tear of the parts and extends the useful life of the ball joint 1. Preferably, the bearing surface 18 is a low friction lining disposed between the socket 11 and the ball head 22. However, other known means for reducing friction, such as bearings or fluids, can also be used to reduce friction in the devices disclosed herein in instead of or in addition to the low friction lining 18.

With reference to FIG. 2, the ball housing 10, ball head 22 and ball pin 24 comprise open passageways 14, 23, and 25, respectively, in serial communications with each other for routing a cable 2 therethrough. The passageway 14 through the ball housing 10, which is referred to herein as the ball housing passageway 14, has a proximal end 14a in communications with the socket 11 and a distal end 14b in communications with the external environment. The ball housing passageway 14 can be constructed so as to provide a sealing fit around the cable 2, such as by way of elastic grommets or the like. The passageway 25 through the ball pin 24, which is referred to herein as the ball pin passageway 25, has a proximal end 25a, which is spaced away from the ball head 22 on one end of the ball pin 24 and a distal end 25b, which is located approximately where the ball pin 24 meets the ball head 22. The passageway 23 through the ball head 22, which is referred herein to as the ball head passageway 23, has a proximal end 23a, which is located approximately adjacent to the surface of the ball head, and approximately adjacent to the distal end 25b of the ball pin passageway 25 where the ball pin 24 meets the ball head 22. The ball head passageway 23 also has a distal end 23b which is approximately adjacent to second surface 29 of the ball head 22.

The distal end 25b of the ball pin passageway 25 is aligned with the proximal end 23a of the ball head passageway 23 in order to allow the cable 2 to pass from the ball pin passageway 25 and into the ball head passageway 23. Upon exiting from distal end 23b of the ball head passageway 23, the cable 2 is routed into the proximal end 14a of the ball housing passageway 14, through the ball housing passageway 14 and out of the ball housing 10. The bearing surface 18, or other components disposed between the ball head passageway 23 and the ball housing passageway 14 would also include respective passageways therethrough corresponding to, and connecting to, the ball housing passageway 14.

In some embodiments of the invention the diameter of the ball pin passageway 25 is constant along the entire passageway 25, and the passageway 25 can run straight along the body of the ball pin 24 parallel to the walls of the ball pin 24, as shown in FIG. 2, to minimize the wear and tear on the cable running therethrough. Additionally, sealing elements, such as grommets or the like, can be disposed in or around the ball pin passageway 25 to prevent dust or debris from entering into the passageway 25. It will be understood, of course, that the diameter, orientation and/or shape of the ball pin passageway 25 can be tailored to fit the particular application, and thus can vary widely in different embodiments.

In some embodiments of the invention, the ball head passageway 23 will pass through or close to the center of the ball head 22 in order to minimize tension on the cable 2, which can be caused by the rotation of the ball pivot 20. Although the size, orientation and shape of the ball head passageway 23 can also vary depending on the specific use of the ball joint, in preferred embodiments, the ball head passageway 23 is of constant size from its proximal end 23a to its distal end 23b, and the distal end 23b exits within the second region 29 of the surface of the ball head 22.

In preferred embodiments the second region 29 of the external surface of the ball head 22 is concave in shape with respect to the first region 21, thereby forming a cable containment region 19 defined by the second region 29 and the inner surface 12 of the housing 10. It will be appreciated that the location of this cable containment region 19 will change with respect to the housing 10 as the ball joint 20 moves. However, in preferred embodiments, at all times the proximal end 14a of the ball housing passageway 14 remains in direct communications with the cable containment region 19; that is, it is preferred that the first region 21 of the external surface of the ball head 22 not cover or impinge upon the proximal end 14a of the ball housing passageway 14.

It will be appreciated that the cable containment region 19 can simply be thought of as another section of the ball head passageway 23. For example, if the angular extents of the cable containment region 19 are relatively small, such as less than 20 degrees, the cable containment region 19 can visually appear to be part of the ball head passageway 23. On the other hand, if the angular extents of the cable containment region 19 are relatively large, such as in excess of 45 degrees, then the ball head passageway 23 can visually appear as an opening 23b that connects to the second surface 29. For consistency in the following discussion, the cable containment region 19 is treated as distinct from the ball head passageway 23, but this merely for the sake of convenience.

In preferred embodiments the ball pin 24 extends perpendicularly, i.e., in the radial direction with respect to a center 3 of the spherically shaped first section 21, away from the first surface 21 of the ball head 22. The ball pin passageway 25 forms a longitudinal conduit through the ball pin 24 and directly connects to the ball head passageway 23. In preferred embodiments, the ball head passageway 23 also provides a conduit along the radial direction with respect to the first surface 21 of the ball head 22, connecting directly with the second surface 29 and hence the cable containment region 19. Hence, in preferred embodiments the cable containment region 19 includes the geometric center of the first surface 21 of the ball head 22. However, this need not be the case, and as such in some embodiments the centerline of the ball head passageway 23 can have an angular offset from the centerline of the ball pin passageway 25; that is, the centerlines of the ball head passageway 23 and the ball pin passageway 25 need not be parallel.

A first centerline 4 can be defined as passing through the geometric center of the second region 29 and the center 3 of the semispherical first region 21, and can be thought of as the centerline of the cable containment region 19. A second centerline 6 can be defined as passing through the center 3 of the semispherical first region 21 and the geometric center of the opening 16; the second centerline 6 can thus be thought of as the direction that the opening 16 faces with respect to the socket 11. In preferred embodiments when the ball pin 24 is centered within the opening 16, the centerline 6 lies on the ball pin passageway 25. In various embodiments the centerlines of the ball pin passageway 25 and ball head passageway 23 lie on the second centerline 6 when the ball pin 24 is centered in the opening 16. However, it is preferred that the second region 29 be constructed such that the first centerline 4 is not parallel to the second centerline 6 when the ball pin 24 is centered in the opening 16. Hence, in preferred embodiments the centerlines of the ball pin passageway 25 and ball head passageway 23 are not parallel to the centerline of the cable containment region 19; in particularly preferred embodiments the centerline of the ball pin 24 is offset from 80 to 100 degrees from the centerline 4 of the cable containment region 19. It is also preferred that the angular offset of the centerline of the ball housing passageway 14 with respect to the centerline 6 of the opening 16 be substantially equal to the angular offset of the ball pin 24 with respect to the cable containment region 19. Hence, when the ball pin 24 is centered within the opening 16, in such preferred embodiments the ball housing passageway 14 then lies on the cable containment region centerline 4. Further, it is preferred that the angular extents of the opening 16 in the housing 10 and the corresponding angular extents of the second region 29 be such that region 19 cannot directly connect with the opening 16, regardless of the location of ball pin 24 in opening 16. This condition prevents dust and debris from entering region 19 through opening 16.

By way of a non-limiting example, FIG. 2 shows an embodiment in which the ball head passageway 23 is a straight section aligned with a similarly straight ball pin passageway 25, and the cable containment region 19 is cone-shaped. As used herein, the term "cone-shaped" should be understood as any shape in which the opening gradually tapers from larger to smaller. The taper can be linear, curved, or stepped without limitation. The centerline 4 of the cone-shaped cable containment region 19 is offset by, for example, 80 to 100 degrees from the centerline 6 of the passageways 23, 25.

Figure 3:
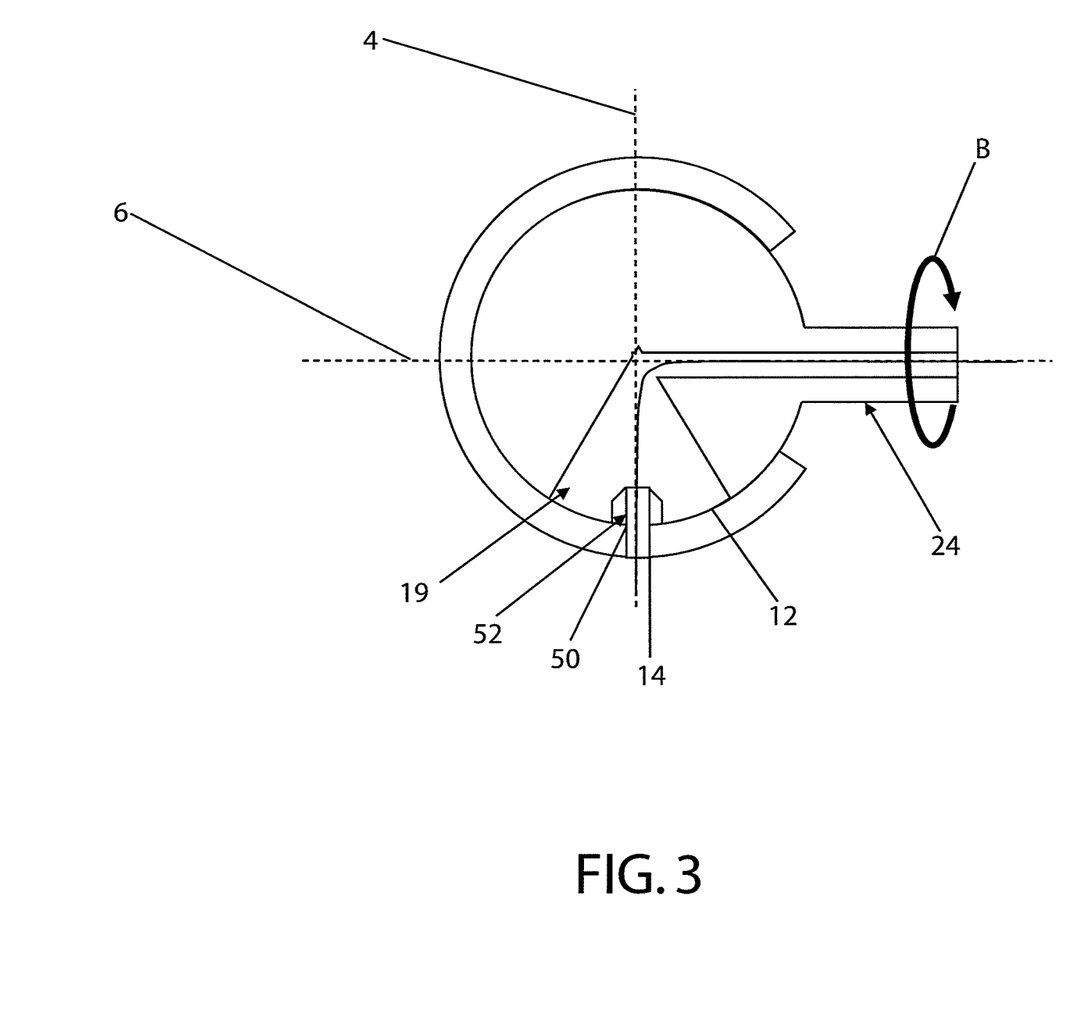

In some embodiments the ball joint 10 can further include additional means for limiting rotation of the ball pivot 20. In such embodiments the ball joint 20 can include a limiter 50, as shown in FIGS. 1 and 3. The limiter 50 is preferably disposed on, or through, the inner surface 12 of the ball housing 10 and extends radially inward towards to center 3 of the ball joint head 22. In preferred embodiments the limiter 50 is aligned with the ball housing passageway 14, and thus includes a corresponding passageway 52 of its own that is aligned with the passageway 14. Suitable limiters 50 include, but are not limited to, pins, cups, knobs, set screws, projections on the ball housing 10 or on the ball head 22, or their equivalents.

As shown in FIG. 3, the limiter 50 can be located in order to limit or prevent the ball head 22 from spinning within the socket 11, i.e. rotating in the direction indicated by the arrow B around the second centerline 6 running along the centerline of the ball pin 24. To that end, the limiter 50 preferably extends above the inner surface 12 to protect the cable 2 that runs through the limiter passageway 52. By both shielding the cable 2 from contact with the second surface 29 and preventing spinning of the ball head 22, the limiter 50 prevents or minimizes potential damage due to wear or twisting of the cable 2. The limiter 50 can include seals, such as grommets within the passageway 52, to prevent dirt or debris from entering into the socket 11.

The ball joints disclosed herein can be utilized in many various applications. By way of a non-limiting example, these ball joints can be utilized in control units for telematic control of robotic systems. In such systems, a user moves the ball pivot, and the movement of the ball pivot head is measured and translated into control signals, such as position or velocity signals. The signals are then sent to a distant robotic system to cause the system to move in a corresponding manner.

Figure 4:
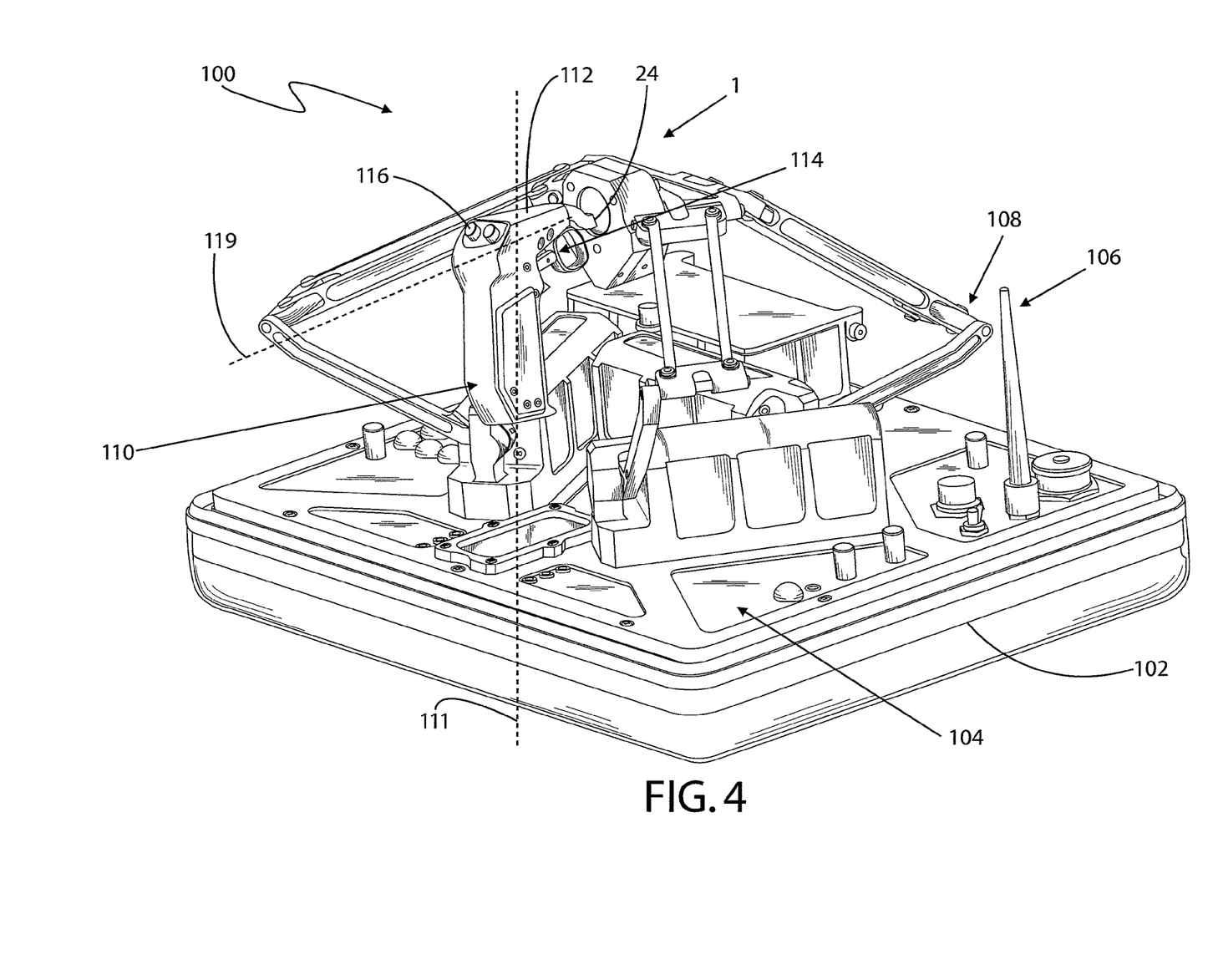
FIG. 4 shows a control unit that utilizes the ball joint of FIG. 1 for telematic control of a robotic system.

Referring to FIGS. 1 and 4, one aspect of the present invention provides a control unit 100 for telematic operation of, for example, a robotic system. As used herein, the word telematic can include any system or technology capable of sensing, sending, receiving, or storing information via telecommunication devices in conjunction with effecting control of remote objects. The control unit 100 can include the embodiment ball joint 1 depicted in FIG. 1. In addition to the features set forth above, the ball joint 1 can include one or more sensors 60 for sensing and measuring the movement of the ball head 22 relative to the ball housing 10. In preferred embodiments the ball joint 1 includes three sensors 60 arranged orthogonally to each other to detect three orthogonal directions of movement of the ball head 22. Any suitable sensor 60 can be employed, such as optical sensors, roller-ball mechanical sensors, or the like. The sensors 60, in turn, are electrically connected to control circuitry 104 disposed in a base 102 of the control unit 100. The control circuitry 104 receives information from the one or more sensors 60 and converts this information into control signals that are subsequently sent to a remote robotic system (not shown), such as via a wireless module 106.

In some embodiments, the ball joint 1 is attached to articulated arms 108. The pin 24 of the ball joint 1 is securely attached at a distal end of a grip 110 so that movement of the grip 110 is communicated to the ball joint 1. Information concerning rotation of ball joint 1 and information regarding the position of articulating arms 108 is advantageously used to generate grip 110 position data. This information is then used to generate control signals for controlling the robotic system.

The grip 110 is generally shaped in the form of a pistol grip for ease of grasping and has an elongated form which is generally aligned along a grip axis 111. A rigid support block 112 is mounted to the top side of the grip 110 and is also secured to the distal end of ball pin 24 such that the ball pin 24 extends from a front portion of the grip 110 in a direction 119 which is generally transverse to the grip axis 111.

The grip 110 can include a trigger 114 that extends from a front side of the grip 110 and which faces towards the ball joint 1. As such, the trigger 114 can move in a direction aligned with a corresponding trigger axis 119. The trigger axis 119 can be aligned with a radial direction defined with respect to the grip axis 111 such that the trigger axis 119 and grip axis 111 are generally transverse to each other. Of course, the trigger axis 119 can be slightly canted or angled relative to the line defined by the grip axis 111. Also, the motion of the trigger 114 can be along a path that is somewhat curved rather than perfectly linear. The trigger 114 can include a haptic feedback mechanism that detects the position of the trigger 114 and controls the force exerted by the trigger 114. For examples, the processing circuitry 104 can receive signals from the robotic device and based upon these signals control the force exerted by the trigger 114. The grip 110 can also include control switches 116 at selected locations on the grip 110.

The wires connected to each of the components of the grip 110, such as those used for button 116 signals, position signals for the trigger 114, and haptic feedback control signals for the trigger 114, can be bundled together to form the cable 2. As shown in FIG. 1, the cable 2 is advantageously routed through the passageways 25, 23 and 14 within the ball joint 1. Thereafter, the cable 2 can be routed into the base 102 to the control circuitry 104. The advantage of the foregoing arrangement is that there is no external wiring or cabling connected to the grip 110 which can restrict the movement of the grip 110, snag on user's clothing, or otherwise become damaged by misuse.

The hand controller 100 described herein provides six degrees of freedom (three degrees of linear freedom along orthogonal x, y, z axes, and three degrees of rotational freedom) that can be used to control a robotic device, such as an unmanned ground vehicle (UGV). The robotic device can also include a robot manipulator arm. The hand controller 100 senses input control motions of a user and communicates user input signals to a control system processor. In response, the control system processor communicates motion control command signals to the robotic device for controlling the pose of the robotic device robot arm and/or grasping device. A data link 106 can be used for the purpose of communicating motion control command signals to a remotely located robotic device. The user interface, control system processor, and data link can together comprise a telematic control system with haptic feedback.

All of the apparatus, methods and algorithms disclosed and claimed herein can be made and executed without undue experimentation in light of the present disclosure. While the invention has been described in terms of preferred embodiments, it will be apparent to those of skill in the art that variations can be applied to the apparatus, methods and sequence of steps of the method without departing from the concept, spirit and scope of the invention. More specifically, it will be apparent that certain components can be added to, combined with, or substituted for the components described herein while the same or similar results would be achieved. All such similar substitutes and modifications apparent to those skilled in the art are deemed to be within the spirit, scope and concept of the invention as defined.

We claim:

1. A telematic control unit, comprising:
    a ball joint comprising:
        a ball housing defining a socket having an inner surface, the ball housing having an opening and a first passageway;
        a ball pivot disposed in the socket, the ball pivot comprising a ball head and a ball pin, the ball pin disposed through the opening, the surface of the ball head having a first region conformal to at least a portion of the inner surface of the socket and a second region that is not conformal to the inner surface of the socket;
        wherein the ball head comprises a second passageway connected to the second region and to the ball pin, and the ball pin comprises a third passageway connected to the second passageway and to an external surface of the ball pin;
    one or more sensors disposed within the ball joint; and
    control circuitry in communication with the one or more sensors, the control circuitry configured to communicate with a remote robotic system.

2. The telematic control unit of claim 1 wherein the second region is cone-shaped.

3. The telematic control unit of claim 1 wherein the first passageway extends along a first direction, the opening faces a second direction, and the first direction and second direction are not parallel to each other.

4. The telematic control unit of claim 3 wherein angular extents of the opening with respect to the socket are less than corresponding angular extents of the second region with respect to the ball head.

5. The telematic control unit of claim 3 wherein the first direction and the second direction are from 80 to 100 degrees with respect to each other.

6. The telematic control unit of claim 1 further comprising a limiter extending above the inner surface.

7. The telematic control unit of claim 6 wherein the limiter comprises a fourth passageway that connects with the first passageway.

8. A telematic control unit, comprising:
a ball joint through which a cable can be routed, comprising:
- a ball pivot comprising a ball head and a ball pin, said ball head having a partially spherical shape and said ball pin extending in a radial direction from a surface defined by said ball head;
- a ball housing defining a socket in which said ball head is positioned, said socket configured to permit said ball head to rotate therein about three separate orthogonal axes of rotation;
- a ball pin passage extending through said ball pin;
- a ball housing passage extending through a wall of said ball housing from an interior of said ball housing to an exterior of said ball housing;
- a ball head passage extending through said ball head, from said ball pin passage to said ball housing passage;
- said ball head passage including at least a first section which extends in a first direction, and a second section which extends in a second direction, wherein said first direction is not parallel to said second direction;

one or more sensors disposed within the ball joint and responsive to rotation of said ball pivot within said ball housing;

at least one control cable extending through said ball pin passage, said ball head passage, and said ball housing passage;

a handle grip including at least one control element responsive to a user interaction, said handle grip secured to a proximal end of said ball pin that is spaced away from the ball head, said at least one control cable extending from said ball pin passage to an interior of said handle grip and configured to communicate control signals generated by said at least one control element.

9. The telematic control unit according to claim 8, wherein said first section has an opening that is aligned with said ball pin passage.

10. The telematic control unit according to claim 8, wherein said second section has an opening that is coincident with an opening defined by said ball housing passage within an interior of said ball housing.

11. The telematic control unit according to claim 10, wherein said second section has a cone shape, and said first section is in communication with said second section at an apex portion of said cone shape.

12. The telematic control unit according to claim 10, further comprising at least one limiter pin disposed on said ball housing, said limiter pin extending into a hollow defined within said ball head.

13. The telematic control unit according to claim 12, wherein said hollow is formed from a portion of said second section.

14. The telematic control unit according to claim 12, wherein said limiter pin is generally aligned with said ball housing passage, and further comprises a limiter pin passage extending from said interior of said ball housing to said exterior of said ball housing.

15. The telematic control unit according to claim 10, further comprising a control system configured to process signals received from said sensors and said at least one control element.

16. The telematic control unit according to claim 15, wherein said control system generates one or more robot control signals for controlling a robotic system based on said control signals received from said at least one control element and from sensor signals received from said sensors.

17. The telematic control unit according to claim 15, wherein said control system is configured to communicate haptic control signals through said cable to said at least one control element and said at least one control element is responsive to said haptic control signals to provide haptic feedback to a user.

18. The telematic control unit according to claim 8 wherein said ball housing is pivotally attached to a plurality of articulated arms configured to allow linear movement of said ball housing in a direction aligned with at least one of said three separate orthogonal axes of rotational.

* * * * *